Patented Aug. 28, 1945

2,383,768

UNITED STATES PATENT OFFICE 2,383,768

CALCIUM NAPHTHENATE IN HYDROCARBON EXTRACTION

Marinus Buis, Ellesmere Port, and Leonard Belchetz, Ince, near Chester, England, assignors to Shell Development Company, San Francisco, Calif., a corporation of Delaware No Drawing. Application June 28, 1944, Serial No. 542,608

7 Claims. (Cl. 196—13)

This invention involves an improved liquid-liquid solvent extraction process for hydrocarbons. More particularly, it deals with a method for increasing the rate of separation of the liquid hydrocarbons from the solvent by carrying out the extraction in the presence of a small amount of calcium naphthenate.

Liquid solvent extraction processes comprise contacting a liquid mixture to be extracted with a liquid selective solvent for one of the components of that mixture either in a mixer and settler or countercurrently through a vessel such as a packed tower. The solvent is not completely miscible with the mixture under the conditions of the extraction, so that two liquid phases are formed which are separated and the solvent in either or both of these phases is then removed and may be re-cycled for contact with more of the unextracted mixture.

Previously, wax suppressors such as aluminum and magnesium stearates and palmitates and magnesium and lead naphthenates have been used in processes for the liquid solvent extraction of hydrocarbon oils containing waxes, but calcium naphthenate was not suggested for such processes because it is not a wax suppressor as will be seen from Example VI below.

It is the primary purpose of this invention to improve the separation time, or settling time, between the solvent and hydrocarbon phases produced in such liquid solvent extraction processes, irrespective of whether the hydrocarbon does or does not contain wax.

This invention, as previously stated, comprises carrying out the liquid solvent extraction of a hydrocarbon mixture in the presence of a small amount of calcium naphthenate in order to reduce the time of separation of the hydrocarbon and solvent phases.

As a result of the greater rate of separation the throughput through a given equipment can normally be increased considerably since settling rate is usually the limiting factor. Or else for a given throughput the yield and/or quality of the products may be improved due to reduced carryover. In an extraction tower the number of theoretical extraction stages may increase materially for a given feed rate because of a reduced tendency to carry finely suspended droplets in the wrong direction.

The amount of calcium naphthenate required to increase the separation time depends upon several factors, namely: the type of solvent employed in the process; the type of mixture to be separated in the process; the components in the mixture which affect emulsibility; the molecular weight and the acid equivalent of the calcium naphthenate; etc. For example, if the naphthenic acids have a low acid number, a greater amount is required to produce a given settling time, than if acids of higher acid number had been used. As a rule, oil suspended in the solvent separates much more slowly than solvent suspended in oil, and if too great an amount of calcium naphthenates is used, it will have the effect of inverting the emulsion tendency, thereby increasing the stability of hydrocarbon in solvent emulsions and defeating the purpose of this invention. Generally, suitable amounts of calcium naphthenates range between about .01% and 1% and preferably between .02 and .5% by weight of the hydrocarbon in the mixture.

The calcium naphthenate may be derived from any suitable source. It is most easily produced by simply neutralizing naphthenic acids with lime.

The calcium naphthenate may be added continuously or intermittently either to the hydrocarbons or to the solvent, or to both.

In the course of the extraction, most of the naphthenate goes into the extract phase from which it may be recovered, and, if desired, be returned to the extraction zone. A small portion may remain in the raffinate.

Depending on the use of the raffinate oil or extract oil or both, it may be necessary to remove all or part of the naphthenate therefrom, if such removal has not occurred as a result of removal of the solvent from the respective phases. Removal can normally be achieved by means such as distillation, the naphthenate remaining in the residue; or acidification and distillation, in which case the naphthenic acid may distill overhead; or clay treatment, the naphthenate being retained by the clay; etc.

In some cases, the presence of the napthenate in the extracted oil may be decidedly beneficial. Thus, in lubricants it acts as a detergent, in spray oils it causes increased deposition of toxic agent; in asphalts (which may have been blended with extract oil containing it) it improves the adhesion toward mineral aggregates.

Any hydrocarbon mixture which may be extracted in the liquid phase with a liquid selective solvent may have its separation improved by the process of this invention, particularly those mixtures derived from petroleum including gasolines, kerosenes, spray oils, gas oils, Diesel fuels, lubricating oils, etc.

Some suitable liquid selective solvents which may be employed in the separation of hydrocarbon mixtures are: phenol, cresylic acids, alkyl phenol mixtures, aniline, alkyl anilines, diphenyl amine, ditolyl amines, carbitols (diethylene glycol monoethers) such as methyl, ethyl, propyl carbitols, chlorinated dialkyl ethers such as beta-beta dichlor-ethyl ether, nitrobenzene, nitrotoluene, nitroxylenes, naphthols, alkyl naphthols benzophenone, phenyl tolyl ketone, diphenylene ketone, alkyl phthalates such as dimethyl phthalate, alkyl salicylates such as methyl salicylate, benzyl alcohol, benz chlorides, i. e., benzyl, benzal, benzo-chlorides, benzonitrile, diphenyl oxide, substituted diphenyl oxide which may contain amino, nitro, hydroxy, etc., radicals; ditolyl oxide, substituted ditolyl oxides which may contain amino, nitro, hydroxy, etc., radicals, hydroxy pyridine, nitro pyridine, chlorinated pyridines, substituted quinolines, isoquinoline, chlorinated quinoline, such as hydroxy quinoline, 5-nitroquinoline, quinaldine, beta-alpha picoline, alpha picoline, refinery N-bases, tetrahydrofurfuryl alcohol, furfuryl alcohol, furfural, monoglycerol ethers such as 1-methoxy glycerol, 2-methoxy glycerol, 1-ethoxy-glycerol, 2-ethoxy glycerol, 1-propoxy glycerol, 2-propoxy glycerol, 1-isopropoxy glycerol, 2-isopropoxy glycerol, glycerol diethers such as 1,2-dimethoxy glycerol, 1,3-dimethoxy glycerol, 1,2-diethoxy glycerol, 1,3-diethoxy glycerol, 1,2-dipropoxy glycerol, 1,3-dipropoxy glycerol, 1,2-di-isopropoxy glycerol, 1,3-di-isopropoxy glycerol, mixed diglycerol ether such as 1-ethoxy, 2-methoxy glycerol, 1-methoxy, 3-propoxy glycerol, 1-ethoxy, 2-isopropoxy glycerol, antimony trichloride, crotonaldehyde, acrolein (Foster-Wheeler solvents), various sulfones—sulfolanes, 2-sulfolenes, sulfoxides, aliphatic sulfones, etc.

The following examples illustrate the effectiveness of this invention:

Example I

Several samples of a Colon waxy distillate lubricating oil were extracted with furfural in the presence of different amounts of calcium naphthenate and in the absence of calcium naphthenate. The influence of the concentration of the calcium naphthenate having a relatively high molecular weight and an acid value equivalent to 115 mgs. of KOH per gm. on such extraction mixtures is shown in the table below:

| Percent calcium naphthenate | Type emulsion |
|---|---|
| Nil | Stable oil in furfural. |
| 0.01-0.03% w/w | Coagulation and rapid settling. |
| 0.05% | Incipient furfural in oil. |
| Above 0.1% | Stable furfural in oil. |

Example II

Two samples of Colon waxy distillate lubricating oil were extracted with furfural at different solvent-to-feed ratios and in the absence and in the presence of calcium naphthenate to obtain a substantially identical product. As can be seen from the table below, the presence of calcium naphthenate materially reduces the solvent-to-feed ratio necessary to obtain the given V. I. (viscosity index) from the same lubricating oil.

| | No calcium naphthenate used | 0.015% calcium naphthenate added to waxy distillate |
|---|---|---|
| Solvent ratio % vol. | 4×200 | 3×200 |
| R. I.[1] of waxy raff. | 1.4674 | 1.4682 |
| V. I. of waxy raff. | 113 | 116 |
| V. I. above raff. after dewaxing | 96 | 97 |

[1] R. I.=refractive index.

Example III

Several samples of an East Texas dewaxed distillate lubricating oil were admixed with dimethyl sulfolane and the settling times were determined for different contents of calcium naphthenate as shown in the following table:

| Percent by wt. calcium naphthenate calculated on the oil | Settling time in minutes |
|---|---|
| 0 | 3.5-4.0 |
| .01 | 2.5-3.0 |
| .1 | 2-2.5 |
| .5 | 2.0 |

Example IV

Two samples of a Mid-Continent dewaxed distillate (250 S. U. vis. at 100° F.) were contacted with 150% by wt. phenols and 250% by wt. propane in a glass bomb at a temperature of 95° F. to simulate conditions present in a DuoSol extraction process. One of the samples contained no calcium naphthenate and the other did contain .33% by wt. of calcium naphthenate in the distillate. It was found that the separation times between the solvent and the oil were 22 seconds and 14 seconds respectively. The resulting phases were then tested to determine the content of the phenol in each phase, and it was found that the sample containing the calcium naphthenate had less phenol in the raffinate than the other sample, as seen by the following table:

| | Phenol contents, percent w. | |
|---|---|---|
| | Raffinate | Extract |
| (1) No calcium naphthenate | 44.4 | 90.5 |
| (2) 0.5% calcium naphthenate | 38.6 | 91.5 |

Example V

Three other samples of dewaxed Mid-Continent lubricating distillate (250 S. U. vis. at 100° F.) were tested similarly to the samples in Example V above and more data was obtained as seen in the following table:

Effect of calcium naphthenate on acid-retention of the raffinate and extract layers in DuoSol extraction

| Percent Ca naphthenate in dist. | Percent phenol recovered from raff. layer | Percent phenol recovered from extract layer | Total phenol recovery, per cent of phenol chg. | Percent calcium | |
|---|---|---|---|---|---|
| | | | | Raff. | Extract |
| 0 | 40.0 | 52.0 | 92.0 | Trace | .002 |
| 0.067 | 37.5 | 58.5 | 96.0 | .004 | .030 |
| 0.333 | 29.1 | 63.4 | 92.5 | .011 | .090 |

Example VI

Several other samples were prepared both with a waxy and the dewaxed Mid-Continent distillate lubricating oil (250 SUV at 100° F.) and subjected to tests similar to those disclosed above in Examples IV and V. It was found that the presence of calcium naphthenate had substantially no effect (within experimental error) on the settling time or the pour point of the wax containing distillate as seen from the following two tables:

Effect of calcium naphthenate on acid settling rate in DuoSol extraction

| Percent Ca naphthenate in distillate | 0.0 | 0.067 | 0.33 |
|---|---|---|---|
| Dewaxed M-C 250 distillate | 25 | 20 | 19 |
| Waxy M-C 250 distillate | 27 | 23 | 21 |

*Effect of calcium naphthenate on pour point of M-C 250 distillate*

| Lubricating oil | Percent Ca naphthenate in oil | Pour point, °F. |
|---|---|---|
| Dewaxed M-C 250 distillate | 0.0 | 5 |
|  | 0.1 | 5 |
|  | 0.5 | 0 |
| Waxy M-C 250 distillate | 0.0 | 90 |
|  | 0.1 | 95 |
|  | 0.5 | 95 |

We claim as our invention:

1. In a liquid-liquid solvent extraction process for the separation of a hydrocarbon mixture with a selective solvent, the improvement comprising carrying out said extraction in the presence of between about .01% and 1% by wt. of calcium naphthenate in said hydrocarbon mixture, said amount being insufficient to cause a stable solvent-in-hydrocarbon emulsion.

2. The process of claim 1, wherein said hydrocarbon mixture contains paraffin wax.

3. The process of claim 1, wherein said hydrocarbon mixture is free from wax.

4. The process of claim 1, wherein said hydrocarbon mixture is a lubricating oil.

5. The process of claim 1, wherein said solvent is furfural.

6. The process of claim 1, wherein the amount of calcium naphthenate is between about .02% and .5% by wt.

7. In a DuoSol extraction process for the separation of a hydrocarbon oil with a mixed solvent comprising a phenol and propane, the improvement comprising carrying out said extraction in the presence of .01% and 1% by wt. of calcium naphthenate, said amount being insufficient to cause a stable solvent-in-hydrocarbon emulsion.

MARINUS BUIS.
LEONARD BELCHETZ.